(12) United States Patent
Baek et al.

(10) Patent No.: US 12,003,829 B2
(45) Date of Patent: Jun. 4, 2024

(54) ELECTRONIC DEVICE FOR PROVIDING TARGET VIDEO IN SPORTS PLAY VIDEO AND OPERATING METHOD THEREOF

(71) Applicant: NAVER CORPORATION, Seongnam-si (KR)

(72) Inventors: Jun Bong Baek, Seongnam-si (KR); Sanggeun Park, Seongnam-si (KR); Seoyeon Hur, Seongnam-si (KR); Junyoung Chung, Seongnam-si (KR); Kyusung Han, Seongnam-si (KR)

(73) Assignee: NAVER CORPORATION, Tokyo (JP)

( * ) Notice: Subject to any disclaimer, the term of this patent is extended or adjusted under 35 U.S.C. 154(b) by 61 days.

(21) Appl. No.: 17/103,199

(22) Filed: Nov. 24, 2020

(65) Prior Publication Data
US 2021/0168468 A1 Jun. 3, 2021

(30) Foreign Application Priority Data

Nov. 29, 2019 (KR) .................. 10-2019-0157692
Oct. 16, 2020 (KR) .................. 10-2020-0134508

(51) Int. Cl.
*H04N 21/81* (2011.01)
*G06V 20/40* (2022.01)
*G06V 40/20* (2022.01)
*H04N 21/234* (2011.01)

(52) U.S. Cl.
CPC ......... *H04N 21/8126* (2013.01); *G06V 20/42* (2022.01); *G06V 40/20* (2022.01); *H04N 21/234* (2013.01); *G06V 20/44* (2022.01)

(58) Field of Classification Search
CPC ............ H04N 21/8126; H04N 21/234; G06K 9/00335; G06K 9/00724; G06K 2009/00738
See application file for complete search history.

(56) References Cited

U.S. PATENT DOCUMENTS

| 10,609,661 B2* | 3/2020 | Abedini ................ H04L 1/1819 |
| 10,701,282 B2* | 6/2020 | El Choubassi ...... H04N 5/2627 |
| 2016/0005435 A1* | 1/2016 | Campbell ............ H04N 9/8211 386/240 |
| 2018/0108380 A1* | 4/2018 | Packard ............. H04N 21/2668 |

(Continued)

OTHER PUBLICATIONS

Naver Sports; "KBO League Scoring Highlight' service edited by AI"; Aug. 29, 2019 https://sports.news.naver.com/news/print.nhn?oid=109&aid=0004076303.

(Continued)

*Primary Examiner* — Jefferey F Harold
*Assistant Examiner* — Franklin S Andramuno
(74) *Attorney, Agent, or Firm* — Greer Burns & Crain Ltd.

(57) ABSTRACT

An operating method of an electronic device includes detecting a reference timing point and a reference location within text broadcasting data and a sports play video, respectively, by mapping the text broadcasting data and the sports play video based on events occurring during sports play, detecting a target location from the reference location in the sports play video using a time interval between the reference timing point and target timing point within the text broadcasting data, and providing a target video based on the target location within the sports play video.

12 Claims, 12 Drawing Sheets

(56) References Cited

U.S. PATENT DOCUMENTS

2018/0199080 A1* 7/2018 Jackson, Jr. ....... H04N 21/2187
2019/0076741 A1* 3/2019 Thompson ....... H04N 21/23418

OTHER PUBLICATIONS

Naver Sports; "Professional Baseball'View all at bat videos' support"; Jul. 30, 2020 https://news.naver.com/main/read.nhn?mode=LPOD&mid=sec&sid1=&oid=092&aid=0 195153.
Jun Bong Baek et al; U.S. Appl. No. 17/104,397, filed Nov. 25, 2020.

* cited by examiner

|    | 1 | 2 | 3 | 4 | 5 | 6 | 7 | 8 | 9 | R  | H  | E | B |
|----|---|---|---|---|---|---|---|---|---|----|----|---|---|
| AA | 0 | 0 | 0 | 0 | 0 | 0 | 0 | 0 | 0 | 6  | 9  | 1 | 4 |
| BB | 0 | 0 | 5 | 3 | 0 | 0 | 0 | 0 |   | 10 | 15 | 2 | 4 |

03:13:13

270p  360p  480p  720p  Automatic

Share batter's box video in 9th inning        Copy URL

Strength   Cheer   Broadcast   Video   Record

Game ended

[Winning pitcher] ABC
Inning 3.0
Hit allowed 3 Lost point 0

[Losing pitcher] DEF
Inning 3.0
Hit allowed 6 Lost point 5

3rd inning  4  5th inning  6th inning  7th inning  8th inning  |9th inning|

(✓) Ball counts excluded

Ball counts excluded ADF
Number of times at bat 2   Hit 0
Four balls 0   Home run 0

▷ Batter's box video

ADF : Batter's box video (Pitcher -> First base threw out)
③ Batting   129km/h slider
② Foul      126km/h slider                          0-2
① Foul      150km/h slider                          0-1

No. 3 hitter BEC
Number of times at bat 2   Hit 0
Four balls 0   Home run 0

▷ Batter's box video

BEC : Right fielder fly-out
⑥ Batting   149km/h Fast ball
⑤ Fast ball 147km/h Fast ball                       0-2
Attempt to hold runner on first base                0-1

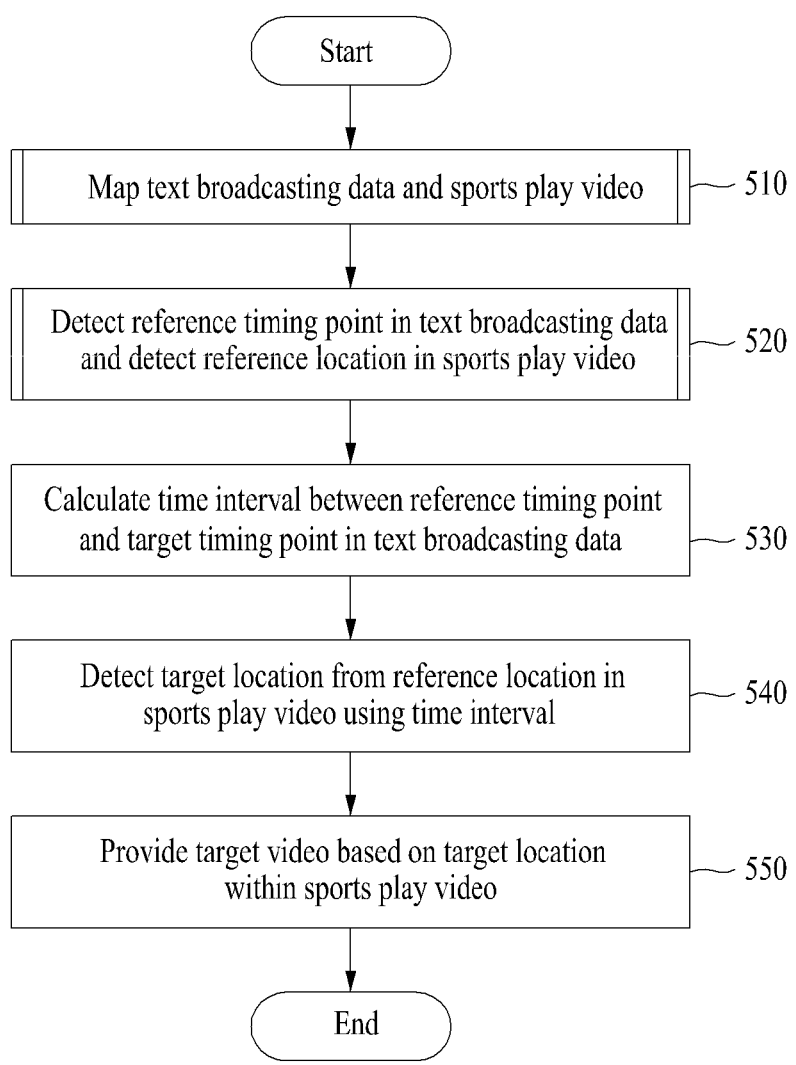

ELECTRONIC DEVICE FOR PROVIDING TARGET VIDEO IN SPORTS PLAY VIDEO AND OPERATING METHOD THEREOF

CROSS-REFERENCE TO RELATED APPLICATION

This application claims priority under 35 U.S.C. § 119 to Korean Patent Application Nos. 10-2019-0157692 filed on Nov. 29, 2019 and 10-2020-0134508 filed on Oct. 16, 2020, which are incorporated herein by reference in their entirety.

BACKGROUND OF THE INVENTION

1. Technical Field

Various embodiments relate to an electronic device for providing a target video in a sports play video and an operating method thereof.

2. Description of the Related Art

In general, a sports play video is provided. Some users want to watch a specific situation occurring during sports play again. To this end, an electronic device generates a target video by analyzing videos obtained through a plurality of cameras during sports play, and provides the target video to a user. That is, the electronic device has to analyze a large amount of data in order to generate the target video, and requires cameras and complicated infrastructure for communicating with the cameras.

BRIEF SUMMARY OF THE INVENTION

Various embodiments provide an electronic device for detecting a target video in a sports play video and providing the target video and an operating method thereof.

Furthermore, various embodiments provide an electronic device for efficiently providing a target video with low complexity in terms of an operation and structure and an operating method thereof.

According to various embodiments, an operating method of an electronic device may include detecting a reference timing point and a reference location within text broadcasting data and a sports play video, respectively, by mapping the text broadcasting data and the sports play video based on events occurring during sports play, detecting a target location from the reference location in the sports play video using a time interval between the reference timing point and target timing point within the text broadcasting data, and providing a target video based on the target location within the sports play video.

According to various embodiments, a program for executing the operating method in the electronic device is written in a non-transitory computer-readable recording medium.

According to various embodiments, an electronic device includes a memory and a processor coupled to the memory and configured to execute at least one instruction stored in the memory. The processor may be configured to detect a reference timing point and a reference location within text broadcasting data and a sports play video, respectively, by mapping the text broadcasting data and the sports play video based on events occurring during sports play, detect a target location from the reference location in the sports play video using a time interval between the reference timing point and target timing point within the text broadcasting data, and provide a target video based on the target location within the sports play video.

BRIEF DESCRIPTION OF THE DRAWINGS

FIGS. 4A and 4B are diagrams for describing services provided by the electronic device according to various embodiments.

FIG. 5 is a diagram illustrating an operating method of the electronic device according to various embodiments.

DETAILED DESCRIPTION OF THE INVENTION

Hereinafter, various embodiments of this document are described with reference to the accompanying drawings.

In this document, the term "event" may mean a notable operation or an incident occurring during sports play, i.e., during the playing of the sport. For example, if the sports play, i.e., the sport being played, is baseball, the event may include at least one of pitching, a home run, a hit or a score. For another example, if the sports play is soccer, the event may include at least one of scoring or shooting.

In this document, "text broadcasting data" may mean text data that broadcasts a real-time situation of sports play. In this case, the text broadcasting data indicates a history of events, and may include identification information and an actual timing point of each event, for example. In this document, a "sports play video" may mean video data that broadcasts sports play, i.e., the sport being played. In this document, a "target video" may indicate a partial video associated with at least one event in a sports play video.

Figure 1:
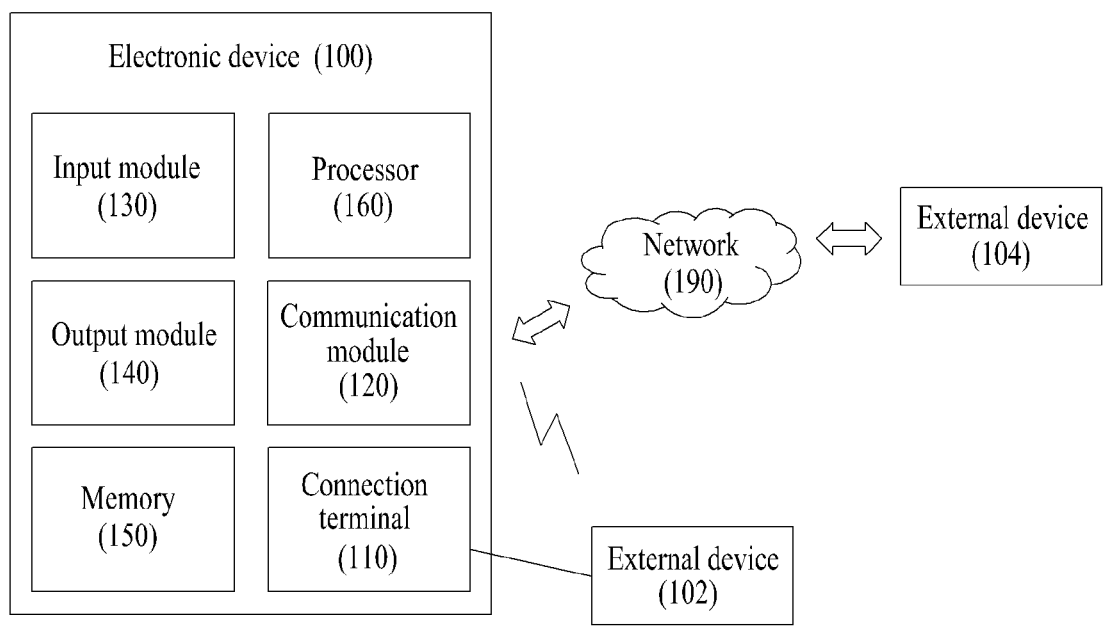
FIG. 1 is a diagram illustrating an electronic device according to various embodiments.
Figure 2:
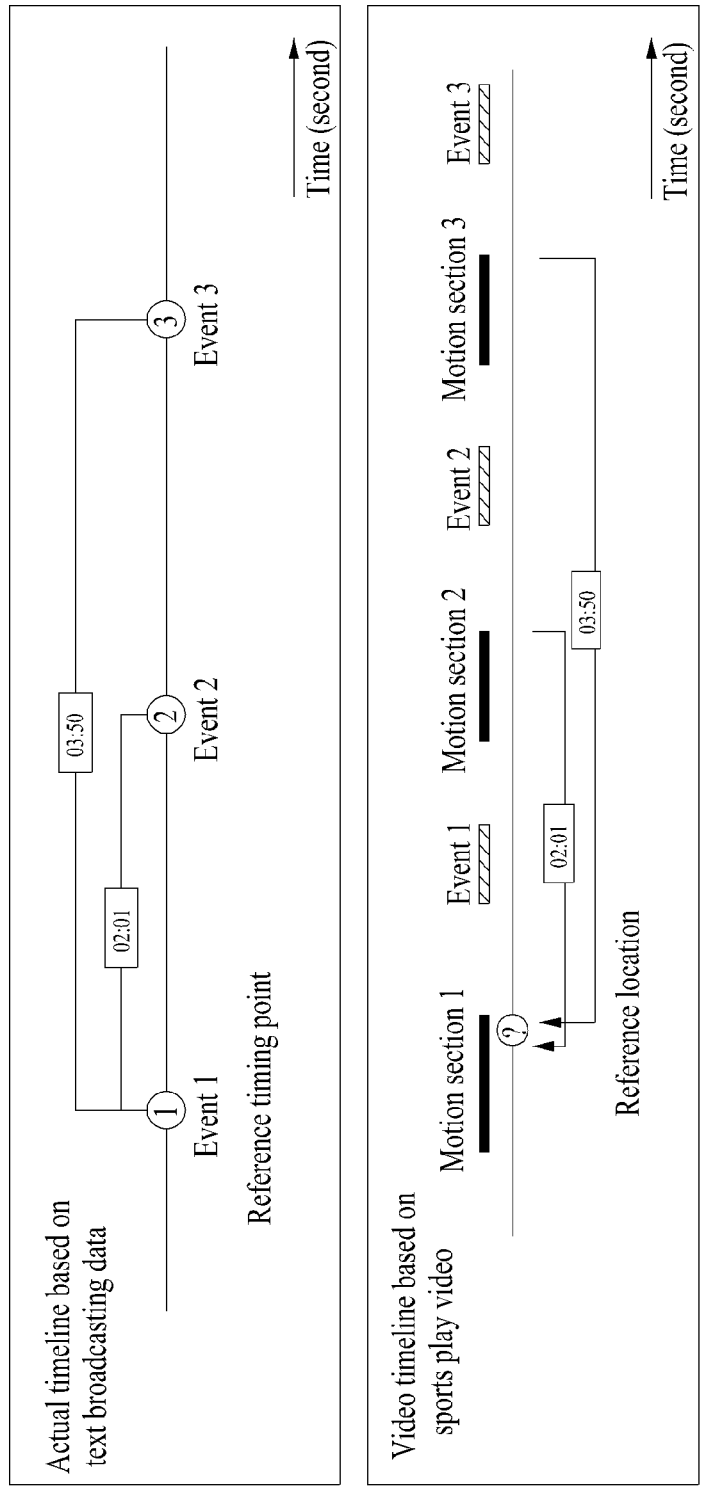
FIGS. 2 and 3 are diagrams for describing operation characteristics of the electronic device according to various embodiments.
Figure 3:
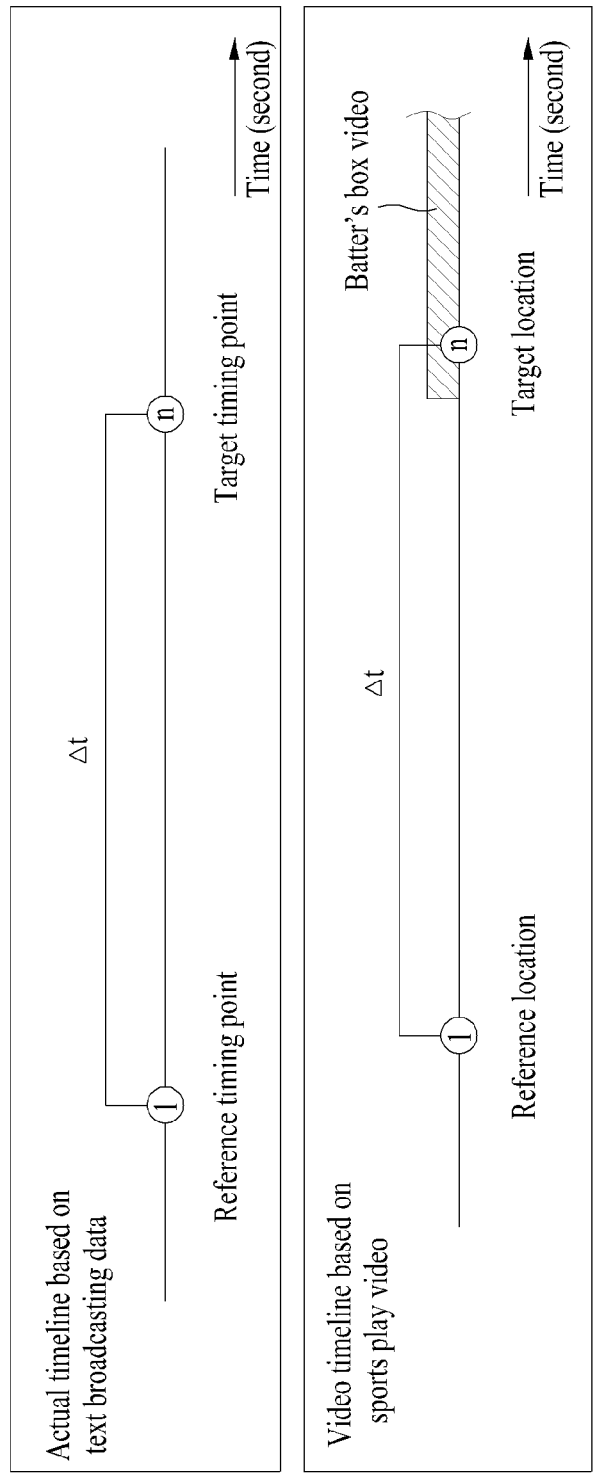
Figure 4A:
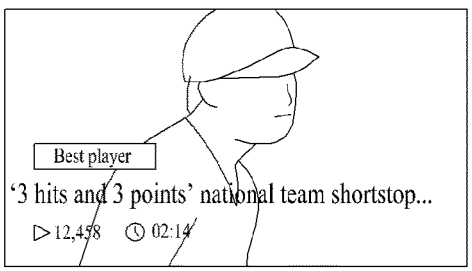

FIG. 1 is a diagram illustrating an electronic device 100 according to various embodiments. FIGS. 2 and 3 are diagrams for describing operation characteristics of the electronic device 100 according to various embodiments. FIGS. 4A and 4B are diagrams for describing services provided by the electronic device 100 according to various embodiments.

Referring to FIG. 1, the electronic device 100 according to various embodiments may include at least one of a connection terminal 110, a communication module 120, an input module 130, an output module 140, a memory 150, or a processor 160. In some embodiments, at least one of the elements of the electronic device 100 may be omitted, and at least another element may be added to the elements of the electronic device 100. In some embodiments, at least any two of the elements of the electronic device 100 may be implemented as a single integrated circuit. In this case, the electronic device 100 may be a single server or may include a plurality of servers. According to one embodiment, the electronic device 100 may be a server for providing a target video as a partial video of a sports play video. According to another embodiment, the electronic device 100 includes a server for providing a target video as a partial video of a sports play video, and may further include at least one of a server for live broadcasting a sports play video during sports play or a server for providing text broadcasting data during sports play.

The connection terminal 110 of the electronic device 100 may be physically connected to an external device 102. For example, the external device 102 may include another electronic device. To this end, the connection terminal 110 may include at least one connector. For example, the connector may include at least one of an HDMI connector, a USB connector, an SD card connector, or an audio connector.

The communication module 120 of the electronic device 100 may perform communication with the external device 102, 104. The communication module 120 may set up a communication channel between the electronic device 100 and the external device 102, 104, and may perform communication with the external device 102, 104 through the communication channel. The communication module 120 may include at least one of a wired communication module or a wireless communication module. The wired communication module is connected to the external device 102 in a wired manner through the connection terminal 102, and may communicate with the external device 102 in a wired manner. The wireless communication module may include at least one of a short-distance communication module or a long-distance communication module. The short-distance communication module may communicate with the external device 102 using a short-distance communication method. For example, the short-distance communication method may include at least one of Bluetooth, WiFi direct, or infrared data association (IrDA). The long-distance communication module may communicate with the external device 104 using a long-distance communication method. In this case, the long-distance communication module may communicate with the external device 104 over a network 190. For example, the network 190 may include at least one of a cellular network, the Internet, or a computer network, such as a local area network (LAN) or a wide area network (WAN).

In this case, the external device 102, 104 may include at least one of another server, an electronic device, a satellite or a base station. For example, the electronic device may include at least one of a smartphone, a mobile phone, a navigation device, a computer, a notebook, a terminal for digital broadcasting, a personal digital assistants (PDA), a portable multimedia player (PMP), a tablet PC, a game console, a wearable device, an Internet of things (IoT) device, home appliances, a medical device, or a robot. According to one embodiment, when the electronic device 100 is a server for providing a target video as a partial video of a sports play video, another server may include at least one of a server for live broadcasting a sports play video during sports play or a server for providing text broadcasting data during sports play. In this case, an electronic device may request the target video from the electronic device 100, and may use the target video provided by the electronic device 100.

The input module 130 may receive a signal to be used for at least one of the elements of the electronic device 100. The input module 130 may include at least one of an input device configured to enable a user to directly input a signal to the electronic device 100, a sensor device configured to generate a signal by sensing a surrounding environment, or a camera module configured to generate video data by recording a video. For example, the input device may include at least one of a microphone, a mouse, or a keyboard. In some embodiments, the sensor device may include at least one of a touch circuitry configured to sense a touch or a sensor circuit configured to measure the intensity of a force generated by a touch.

The output module 140 may output information. The output module 140 may include at least one of a display module configured to visually display information or an audio module configured to acoustically play back information. For example, the display module may include at least one of a display, a hologram device or a projector. For example, the display module may be implemented as a touch screen by being assembled with at least one of the touch circuitry or sensor circuit of the input module 130. For example, the audio module may include at least one of a speaker or a receiver.

The memory 150 may store various data used by at least one of the elements of the electronic device 100. For example, the memory 150 may include at least one of a volatile memory or a non-volatile memory. The data may include at least one program, and input data or output data related to the at least one program. The program may be stored in the memory 150 as software including at least one instruction, and may include at least one of an operating system, middleware or an application, for example.

The processor 160 may control at least one of the elements of the electronic device 100 by executing a program stored in the memory 150. Accordingly, the processor 160 may perform data processing or an operation. In this case, the processor 160 may execute instructions stored in the memory 150. The processor 160 may provide at least one target video based on a sports play video. For example, the processor 160 may sequentially store unit videos for a predetermined time, for example, in a 1 minute unit while sports play is live broadcasted, and may generate a sports play video by combining the unit videos when the sports play is ended. For example, if the sports play is baseball, a target video may be an individual batter's box video, i.e., a target video of a player in the batter's box. For another example, if the sports play is soccer, a target video may be an individual score video or a score collection video. In this case, the processor 160 may define a target video in a sports play video using text broadcasting data for the sports play.

According to various embodiments, the processor 160 may map text broadcasting data and a sports play video based on events occurring during sports play. For example, if the sports play is baseball, each event may indicate each pitch. For another example, if the sports play is soccer, each event may indicate each score.

The processor 160 may confirm the occurrence locations of respective events in a sports play video. In this case, the occurrence locations merely indicate temporal locations in the sports play video, and do not indicate actual times. According to one embodiment, the processor 160 may confirm the occurrence locations of respective events in a sports play video by recognizing the score board of the sports play video. For example, as illustrated in FIG. 2, the processor 160 may confirm the occurrence locations of respective events in a video timeline defined based on a sports play video. Furthermore, the processor 160 may confirm the motion sections of predetermined motions between the occurrence locations, respectively, by recognizing the motions in the sports play video. In this case, the motions may indicate actions of at least one object that match at least one condition predetermined in relation to events, respectively. For example, the object may include at least one of a person or a thing. Furthermore, the processor 160 may check actual timing points of the events in text broadcasting data. For example, as illustrated in FIG. 2, the processor 160 may confirm actual timing points of events in an actual timeline defined based on text broadcasting data. Accordingly, the processor 160 may map occurrence locations and the actual timing points based on the events. In other words, the processor 160 may map the occurrence locations and the actual timing points, respectively, in order of the events.

According to various embodiments, the processor 160 may detect a reference timing point and a reference location in text broadcasting data and a sports play video. The processor 160 may detect an actual timing point of the first event, among events, as the reference timing point in the text broadcasting data. Furthermore, the processor 160 may calculate each of time intervals between the reference timing point and each of actual timing points of the remaining events in the text broadcasting data. For example, as illustrated in FIG. 2, the processor 160 may detect a reference timing point in an actual timeline, and may calculate time intervals. Accordingly, the processor 160 may detect the reference location in the sports play video by applying the time intervals to the motion sections of the sports play video, respectively. For example, as illustrated in FIG. 2, the processor 160 may detect the reference location that is converged from the motion sections in the sports play video by subtracting the respective time intervals from the motion sections in the video timeline.

According to various embodiments, the processor 160 may calculate a time interval Δt between the reference timing point and a target timing point in text broadcasting data. For example, as illustrated in FIG. 3, the processor 160 may determine target timing point in an actual timeline, and may calculate a time interval Δt between the reference timing point and the target timing point. In this case, the target timing point may be determined in response to a request from a service user. For example, the processor 160 may receive, from the external device 102, 104, a request from a service user, and may determine target timing point.

For example, if the sports play is baseball, the processor 160 may provide the external device 102, 104 with a first service screen 410, such as that illustrated in FIG. 4A. When a service user selects an up-one-level menu, for example, a "view all videos for each batter's box" in the first service screen, the processor 160 may provide the external device 102, 104 with a second service screen 420, such as that illustrated in FIG. 4B. Furthermore, when the service user selects a down-one-level menu, for example, "batter's box video" of a No. 3 hitter in the second service screen 420, the processor 160 may determine, as target timing point, the first pitch timing point in the corresponding batter's box of the No. 3 hitter from text broadcasting data. Accordingly, the processor 160 may calculate a time interval Δt between the reference timing point and the target timing point in an actual timeline.

According to various embodiments, the processor 160 may detect a target location from a reference location in a sports play video using a time interval Δt. For example, as illustrated in FIG. 3, the processor 160 may detect the target location in the sports play video by adding the time interval Δt to the reference location in the video timeline.

According to various embodiments, the processor 160 may provide a target video based on a target location within a sports play video. The processor 160 may confirm a motion section including the target location, among motion sections, and may determine the target video based on the motion section. In this case, the processor 160 may determine the target video from the starting position of the motion section. According to one embodiment, the processor 160 may individually provide target videos. For example, if the sports play is baseball, a target video may indicate an individual batter's box video, and the starting point of the target video may indicate the starting position of the first pitch motion of the individual batter's box in a sports play video. For another example, if the sports play is soccer, a target video may indicate an individual score video, and the starting point of the target video may indicate the starting position of a pass motion for conversion between offense and defense prior to a corresponding score or a shooting motion associated with the corresponding score in the sports play video. According to another embodiment, the processor 160 may provide a combined target video by connecting a plurality of target videos. For example, if the sports play is soccer, a combined target video may indicate a score collection video. The starting point of an individual target video in the combined target video may indicate the starting position of a pass motion for conversion between offense and defense prior to a corresponding score or a shooting motion associated with the corresponding score in the sports play video.

Figure 6:
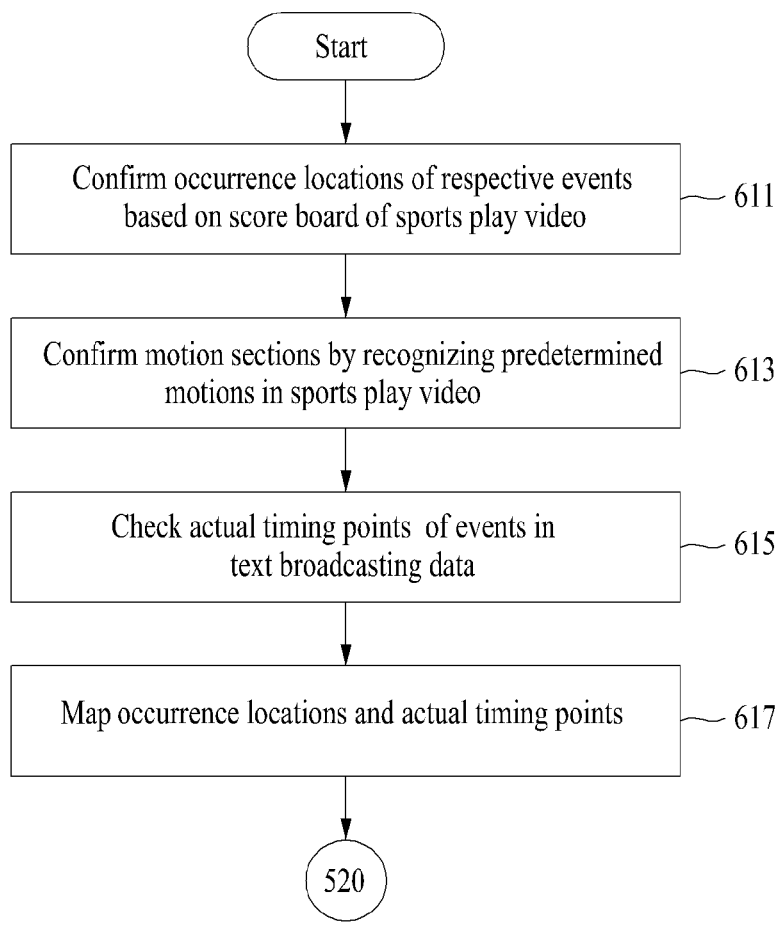
FIG. 6 is a diagram illustrating the step of mapping text broadcasting data and sports play video in FIG. 5.
Figure 7:
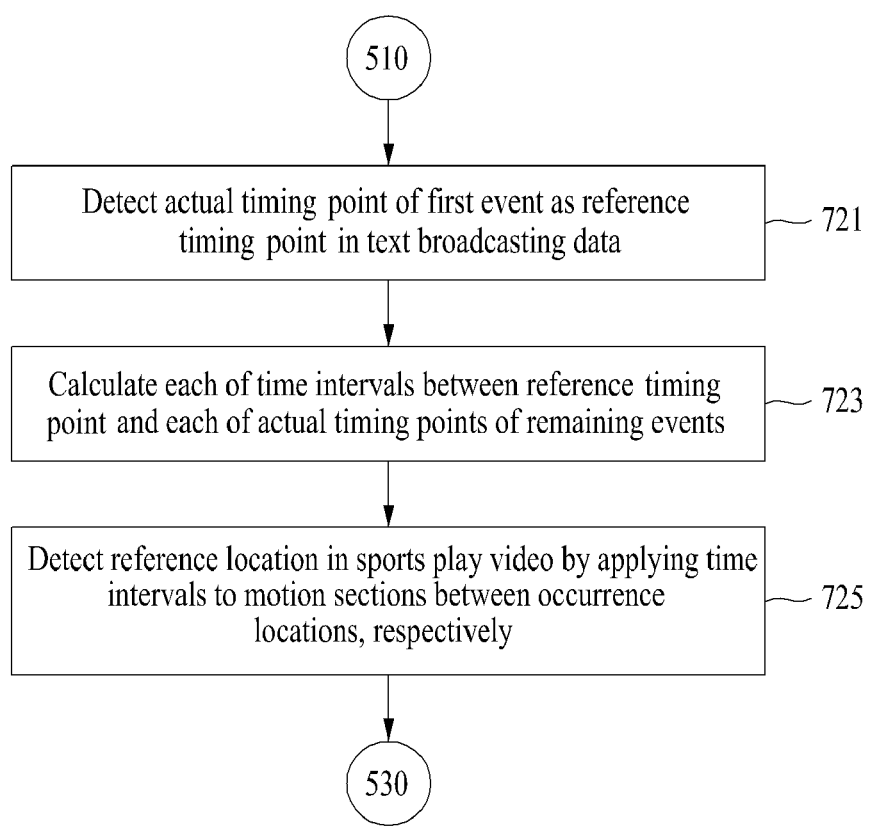
FIG. 7 is a diagram illustrating the step of detecting a reference timing point in text broadcasting data and detecting a reference location in a sports play video in FIG. 5.
Figure 8:
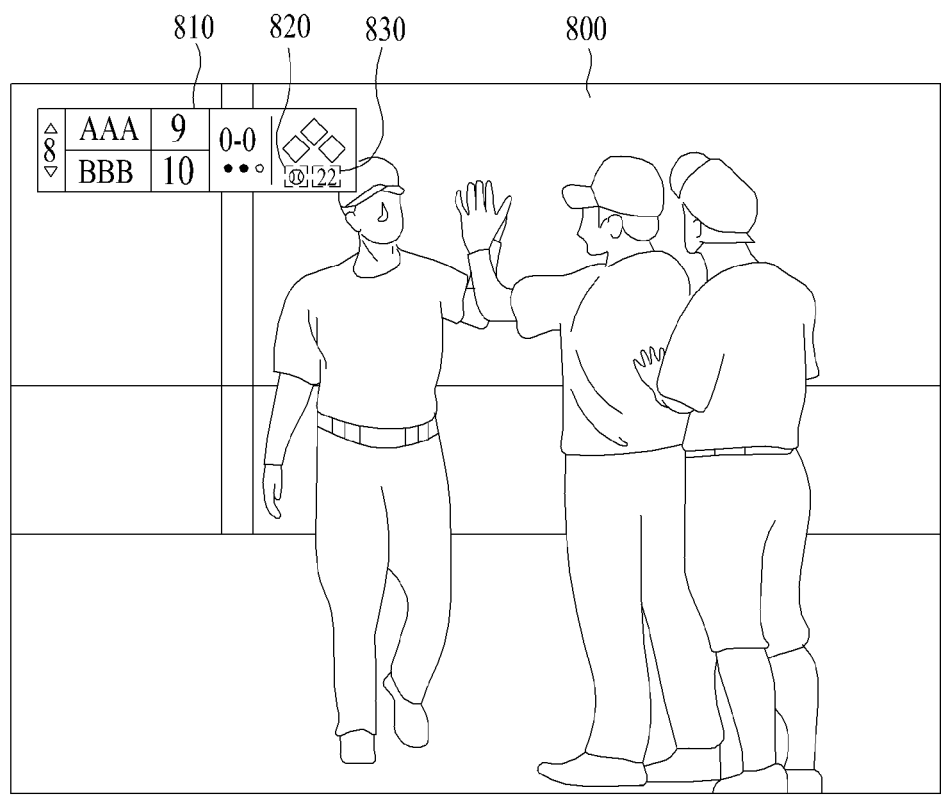
FIGS. 8, 9, 10 and 11 are diagrams for describing an operating method of the electronic device according to an embodiment.
Figure 9:
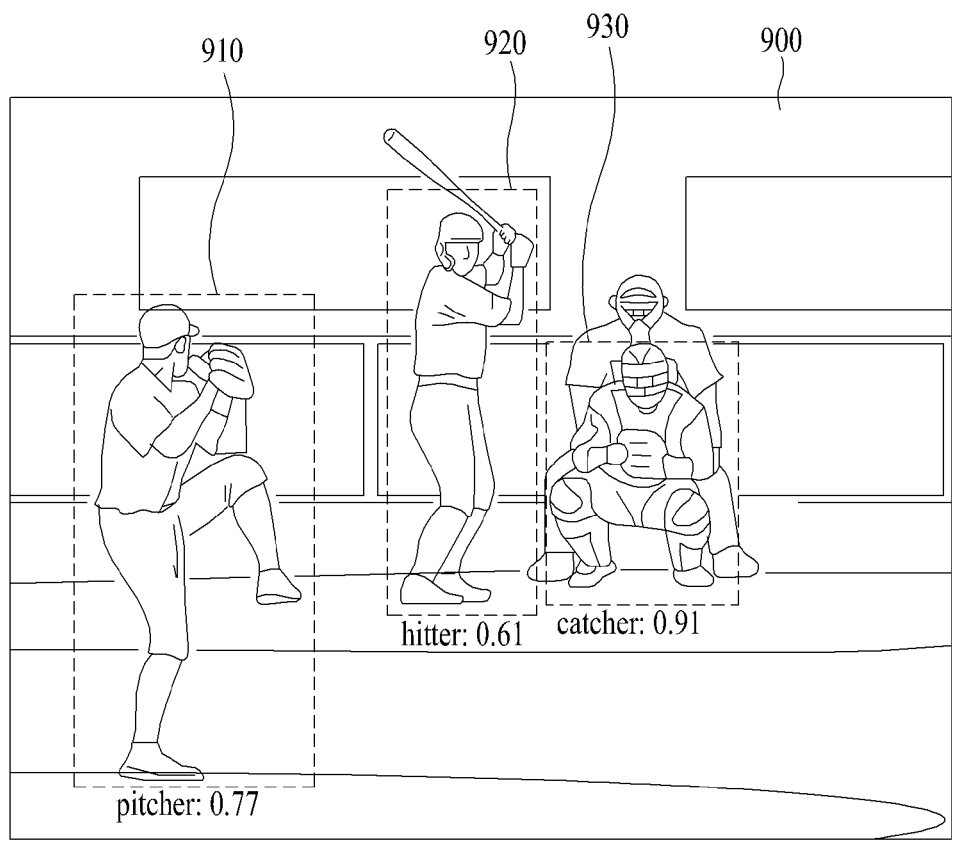

FIG. 5 is a diagram illustrating an operating method of the electronic device 100 according to various embodiments. FIG. 6 is a diagram illustrating the step (step 510) of mapping text broadcasting data and sports play video in FIG. 5. FIG. 7 is a diagram illustrating the step (step 520) of detecting a reference timing point in text broadcasting data and detecting a reference location in a sports play video in FIG. 5. FIGS. 8 and 9 are diagrams for describing an operating method of the electronic device 100 according to an embodiment.

Referring to FIG. 5, at step 510, the electronic device 100 may map text broadcasting data and a sports play video for sports play. The processor 160 may map the text broadcasting data and the sports play video based on events occurring during sports play. For example, if the sports play is baseball, each event may indicate each pitch. For another example, if the sports play is soccer, each event may indicate each score. This will be more specifically described with reference to FIG. 6.

Referring to FIG. 6, at step 611, the electronic device 100 may confirm occurrence locations of respective events in a sports play video. In this case, the occurrence locations merely indicate temporal locations in the sports play video, respectively, and do not indicate actual time on the clock. In this case, the processor 160 may confirm the occurrence locations of the respective events in the sports play video by recognizing the score board of the sports play video. For example, as illustrated in FIG. 2, the processor 160 may confirm the occurrence locations of the respective events in a video timeline defined based on the sports play video.

According to one embodiment, the processor 160 may continuously track a score board 810 in a sports play video 800. In this case, as illustrated in FIG. 8, the processor 160 may recognize the score board 810 in the sports play video 800. In this case, the processor 160 may detect the area of the score board 810 in the sports play video 800 using an artificial intelligence module, such as YOLOv3. Furthermore, the processor 160 may recognize an event count 830 in the score board 810. In this case, the event count 830 is a number. The processor 160 may recognize the event count 830 using a vision module, such as an optical character reader (OCR). Accordingly, the processor 160 may confirm a location where an event occurs in response to a change in the event count 830. That is, the processor 160 may monitor a change in the event count 830 while tracking the score board 810, and thus may confirm the location where the event occurs. For example, if the sports play is baseball, an event may indicate each pitch. The event count 830 may indicate a cumulative pitching number in the sports play. For another example, if the sports play is soccer, an event may indicate each score. The event count 830 may indicate a total score in the sports play.

For example, as illustrated in FIG. 8, the processor 160 may identify a predetermined index 820 in the score board 810. The index 820 may have at least one of a predetermined shape or size. For example, if the sports play is baseball, the index 820 may have a baseball shape. In this case, the processor 160 may identify the index 820 by performing template matching, for example, and thus may detect the location of the index 820 in the score board 810. Thereafter, as illustrated in FIG. 8, the processor 160 may recognize the event count 830 based on the index 820 in the score board 810. In this case, the processor 160 may predict the location of the event count 830 based on the location of the index 820 in the score board 810. To this end, the location of the event count 830 may be predetermined based on the location of the index 820. For example, the location of the event count 830 may be determined as at least one of the right, left, upper part or lower part of the location of the index 820. The processor 160 may recognize the event count 830 at a predicted location. Accordingly, the processor 160 may monitor a change in the event count 830 while tracking the score board 810, and thus may confirm a location where each event occurs.

At step 613, the electronic device 100 may confirm the motion sections of predetermined motions between the occurrence locations, respectively, by recognizing the motions in the sports play video. At this time, the processor 160 may track actions of at least one object in the sports play video. For example, the object may include at least one of a person or a thing. Furthermore, the processor 160 may recognize the predetermined motions from the actions. The processor 160 may recognize the motion using an artificial intelligence (AI) module, such as a tensorflow object detection model, and a rule-based algorithm, for example. In this case, the motions may indicate actions that match at least one condition predetermined in relation to the events, respectively. Furthermore, the processor 160 may check the motion sections between the occurrence locations in accordance with the motions, respectively, in the sports play video.

According to one embodiment, as illustrated in FIG. 9, the processor 160 may track a plurality of actions of objects 910, 920, and 930 in a sports play video 900. In this case, the processor 160 may track the actions of the objects 910, 920, and 930 by comparing frames of the sports play video 900 according to an image analysis scheme. Accordingly, the processor 160 may recognize predetermined motions in the actions. For example, if the sports play is baseball, an event may indicate each pitch, and motions may include a pitching motion. In this case, the pitching motion is determined as a combination of actions of the pitcher 910, the hitter 920, and the catcher 930, and may be determined as at least one of a condition in which the hitter 920 has to be positioned between the pitcher 910 and the catcher 930, a condition in which the head location of the catcher 930 has to be lower than the head location of the hitter 920, or a condition in which the foot placement of the pitcher 910 has to be lower than the foot placement of the catcher 930. For another example, if the sports play is soccer, each event may include each score, and motions may include at least one of a pass motion for conversion between offense and defense or a shooting motion toward a goalpost. Accordingly, the processor 160 may confirm the motion sections between the occurrence locations in accordance with the motions in the sports play video.

At step 615, the electronic device 100 may check actual timing points of events in text broadcasting data. For example, as illustrated in FIG. 2, the processor 160 may check actual timing points of events in an actual timeline defined based on text broadcasting data.

At step 617, the electronic device 100 may map the occurrence locations and the actual timing points based on the events. The processor 160 may map the occurrence locations and the actual timing points in order of the events.

Thereafter, the electronic device 100 may return to FIG. 5, and proceed to step 520.

Referring back to FIG. 5, at step 520, the electronic device 100 may detect a reference timing point and a reference location in the text broadcasting data and the sports play video, respectively. The processor 160 may detect the reference timing point in the text broadcasting data. Furthermore, the processor 160 may detect the reference location in the sports play video based on the reference timing point. This will be more specifically described with reference to FIG. 7.

Referring to FIG. 7, at step 721, the electronic device 100 may detect an actual timing point of the first event, among the events, as the reference timing point in the text broadcasting data.

At step 723, the electronic device 100 may calculate each of time intervals between the reference timing point and each of actual timing points of the remaining events in the text broadcasting data. For example, as illustrated in FIG. 2, the processor 160 may detect the reference timing point in an actual timeline, and may calculate the time intervals.

At step 725, the electronic device 100 may detect a reference location in the sports play video by applying the time intervals to the motion sections of the sports play video, respectively. For example, as illustrated in FIG. 2, the processor 160 may detect the reference location that converges from the motion sections in the sports play video by subtracting the time intervals from the motion sections, respectively, in the video timeline.

Thereafter, the electronic device 100 may return to FIG. 5 and proceed to step 530.

Referring back to FIG. 5, at step 530, the electronic device 100 may calculate a time interval Δt between the reference timing point and a target timing point in the text broadcasting data. For example, as illustrated in FIG. 3, the processor 160 may determine the target timing point in an actual timeline, and may calculate the time interval Δt between the reference timing point and the target timing point. In this case, the target timing point may be determined based on a request from a service user. For example, the processor 160 may receive a request from a service user from the external device 102, 104, and may determine target timing point from text broadcasting data based on the request.

For example, if the sports play is baseball, the processor 160 may provide the external device 102, 104 with a first service screen, such as that illustrated in FIG. 4A. When a service user selects an up-one-level menu, for example, a "view all videos for each batter's box" in the first service screen 410, the processor 160 may provide the external device 102, 104 with a second service screen 420, such as that illustrated in FIG. 4B. Furthermore, when the service user selects a down-one-level menu, for example, a "batter's box video" of a No. 3 hitter in the second service screen 420, the processor 160 may determine, as target timing point, the first pitch timing point in the corresponding batter's box of the No. 3 hitter from the text broadcasting data. Accordingly, the processor 160 may calculate the time interval Δt between the reference timing point and the target timing point in the actual timeline.

At step 540, the electronic device 100 may detect a target location from the reference location in the sports play video using the time interval Δt. For example, as illustrated in FIG. 3, the processor 160 may detect the target location in the sports play video by adding the time interval Δt to the reference location in the video timeline.

At step 550, the electronic device 100 may provide the external device 102, 104 with a target video based on the target location within the sports play video. The processor 160 may confirm a motion section including the target location, among motion sections, and may determine the target video based on the corresponding motion section. In this case, the processor 160 may determine the target video from the starting position of the corresponding motion section. According to one embodiment, the processor 160 may individually provide each target video. For example, if the sports play is baseball, a target video may indicate an individual batter's box video, and the starting point of the target video may indicate the starting position of the first pitch motion of the individual batter's box in a sports play video. For another example, if the sports play is soccer, a target video may indicate an individual score video, and the starting point of the target video may indicate the starting position of a pass motion for conversion between offense and defense prior to a corresponding score or a shooting motion associated with the corresponding score, in a sports play video. According to another embodiment, the processor 160 may provide a combined target video by combining a plurality of target videos. For example, if the sports play is soccer, a combined target video may indicate a score collection video. The starting point of an individual target video in the combined target video may indicate the starting position of a pass motion for conversion between offense and defense prior to a corresponding score or a shooting motion associated with the corresponding score in a sports play video.

Figure 10:
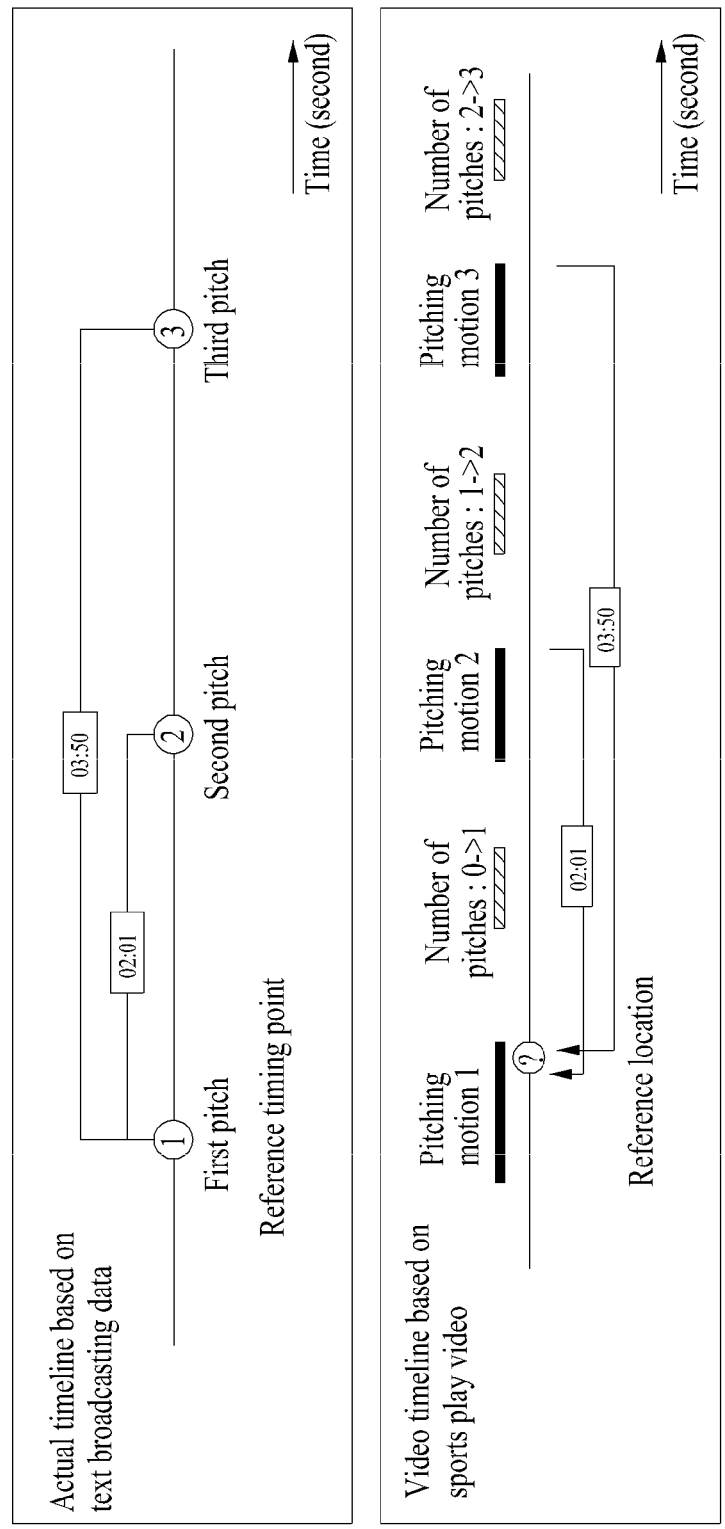
Figure 11:
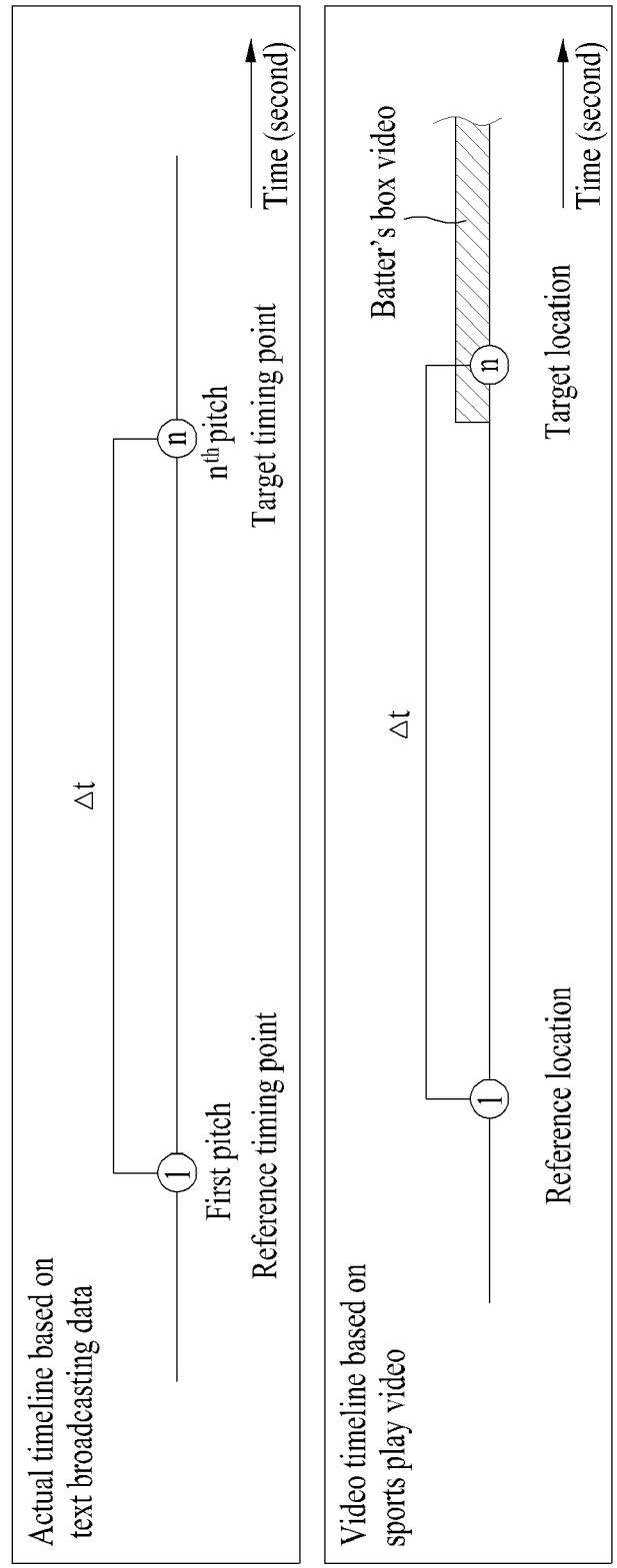

FIGS. 10 and 11 are diagrams for describing an operating method of the electronic device 100 according to an embodiment.

According to one embodiment, if the sports play is baseball, the electronic device 100 may operate to provide an individual batter's box video as a target video. This will be more specifically described with reference to FIGS. 10 and 11 along with FIG. 5. In this case, each event may indicate each pitch.

First, at step 510, the processor 160 may map text broadcasting data and sports play video based on pitches. In this case, as illustrated in FIG. 10, the processor 160 may confirm the occurrence locations of the pitches in a sports play video. At this time, the processor 160 may monitor a change in the number of pitches while tracking a score board in the sports play video, and may confirm the occurrence location of each pitch in the sports play video in response to a change in the number of pitches. Furthermore, the processor 160 may recognize pitching motions by analyzing the sports play video, and may confirm motion sections corresponding to the pitching motions, respectively, in the sports play video, as illustrated in FIG. 10. Furthermore, as illustrated in FIG. 10, the processor 160 may confirm actual timing points of the respective pitches in text broadcasting data. Accordingly, the processor 160 may map the occurrence locations and the actual timing points based on the pitches, respectively.

Next, at step 520, the processor 160 may detect a reference timing point and a reference location in the text broadcasting data and the sports play video, respectively. As illustrated in FIG. 10, the processor 160 may detect, as the reference timing point, an actual timing point of the first pitch of the pitches in the text broadcasting data. Furthermore, the processor 160 may calculate each of time intervals between the reference timing point and each of actual timing points of the remaining pitches in the text broadcasting data. Accordingly, as illustrated in FIG. 10, the processor 160 may detect a reference location that converges from the motion sections in the sports play video by subtracting the time intervals from the motion sections, respectively.

Next, at step 530, the processor 160 may calculate a time interval Δt between the reference timing point and a target timing point in the text broadcasting data. In this case, as illustrated in FIG. 11, the processor 160 may determine the target timing point, and may calculate the time interval Δt between the reference timing point and the target timing point. For example, if the sports play is baseball, the processor 160 may provide the external device 102, 104 with a first service screen, such as that illustrated in FIG. 4A. When a service user selects an up-one-level menu, for example, a "view all videos for each batter's box" in the first service screen 410, the processor 160 may provide the external device 102, 104 with a second service screen, such as that illustrated in FIG. 4B. Furthermore, when the service user selects a down-one-level menu, for example, a "batter's box video" of a No. 4 hitter in the second service screen 420, the processor 160 may determine, as target timing point, the first pitch timing point in the corresponding batter's box of the No. 3 hitter in the text broadcasting data. Accordingly, the processor 160 may calculate the time interval Δt between the reference timing point and the target timing point in an actual timeline.

Next, at step 540, the processor 160 may detect a target location from the reference location in the sports play video using the time interval Δt. In this case, as illustrated in FIG. 11, the processor 160 may detect the target location in the sports play video by adding the time interval Δt to the reference location.

Thereafter, at step 550, the processor 160 may provide a batter's box video based on the target location within the sports play video. The processor 160 may confirm a motion section, including the target location, among the motion sections, and may determine the batter's box video based on the corresponding motion section. In this case, the processor 160 may determine the batter's box video from the starting position of the corresponding motion section. In this case, the starting point of the target video may indicate the starting position of the first pitch motion in an individual batter's box in the sports play video.

According to various embodiments, the electronic device 100 may detect a target video in a sports play video based on text broadcasting data, and may provide the target video. In this case, the electronic device 100 described in this document according to various embodiments can detect and provide the target video even without additional infrastructure for newly obtaining a video because text broadcasting data and the sports play video are used. Accordingly, the electronic device 100 can efficiently provide the target video with low complexity in terms of an operation and a structure. Furthermore, accordingly, the electronic device 100 can provide the target video at a fast speed. For example, the electronic device 100 may provide a target video with several minutes from the end timing point of sports play.

An operating method of the electronic device 100 according to various embodiments may include the step (step 510, step 520) of detecting a reference timing point and a reference location within text broadcasting data and a sports play video, respectively, by mapping the text broadcasting data and the sports play video based on events occurring during sports play, the step (step 530, step 540) of detecting a target location from the reference location in the sports play video using a time interval between the reference timing point and target timing point within the text broadcasting data, and the step (step 550) of providing a target video based on the target location within the sports play video.

According to various embodiments, the operating method may further include the step (step 611) of confirming occurrence locations of the events in the sports play video, respectively, by recognizing a score board of the sports play video.

According to various embodiments, the operating method may further include the step (step 613) of confirming motion sections of predetermined motions between the occurrence locations, respectively, by recognizing the predetermined motions in the sports play video.

According to various embodiments, the step (step 510, step 520) of the detecting of the reference timing point and the reference location may include the step (step 615) of checking actual timing points of the events in the text broadcasting data, the step (step 617) of mapping the occurrence locations and the actual timing points, respectively, the step (step 721) of detecting an actual timing point of a first event, among the events, as the reference timing point, and the step (step 723, step 725) of detecting the reference location by applying each of time intervals between the reference timing point and each of the actual timing points of remaining events among the events in the text broadcasting data to each of the motion sections between the occurrence locations.

According to various embodiments, the step (step 550) of the providing of the target video may include the step of determining the target video based on a motion section comprising the target location.

According to various embodiments, the step (step 611) of confirming the occurrence locations may include the steps of recognizing the score board in the sports play video, identifying a predetermined index within the score board, recognizing an event count based on the location of the index within the score board, and confirming the occurrence location of each event when the event count is changed.

According to various embodiments, the step (step 550) of the providing of the target video may include the step of providing a combined target video by combining the target video with at least another target video.

According to one embodiment, the sports play may be baseball, the events may include pitching, the target video may include an individual batter's box video, the motions may include a pitching motion, and the starting point of the target video indicates the starting position of the first pitch motion in an individual batter's box in the sports play video.

According to another embodiment, the sports play may be soccer, the events may include a score, and the target video may include an individual score video or a score collection video.

The electronic device 100 according to various embodiments may include the memory 150, and the processor 160 coupled to the memory 150 and configured to execute at least one instruction stored in the memory 150.

According to various embodiments, the processor 160 may be configured to detect a reference timing point and a reference location within text broadcasting data and a sports play video, respectively, by mapping the text broadcasting data and the sports play video based on events occurring during sports play, detect a target location from the reference location in the sports play video using a time interval between the reference timing point and target timing point within the text broadcasting data, and provide a target video based on the target location within the sports play video.

According to various embodiments, the processor 160 may be configured to confirm occurrence locations of the events in the sports play video, respectively, by recognizing a score board of the sports play video.

According to various embodiments, the processor 160 may be configured to confirm motion sections of predetermined motions between the occurrence locations, respectively, by recognizing the predetermined motions in the sports play video.

According to various embodiments, the processor 160 may be configured to check actual timing points of the events in the text broadcasting data, map the occurrence locations and the actual timing points, respectively, detect an actual timing point of a first event, among the events, as the reference timing point, and detect the reference location by applying each of time intervals between the reference timing point and each of the actual timing points of remaining events in the text broadcasting data to each of the motion sections between the occurrence locations.

According to various embodiments, the processor 160 may be configured to determine the target video based on a motion section comprising the target location.

According to various embodiments, the processor 160 may be configured to recognize the score board in the sports play video, identify a predetermined index within the score board, recognize an event count based on the location of the index within the score board, and confirm the occurrence location of each event when the event count may be changed.

According to various embodiments, the processor 160 may be configured to provide a combined target video by combining the target video with at least another target video.

According to one embodiment, the sports play may be baseball, the events may include pitching, the target video may include an individual batter's box video, the motions may include a pitching motion, and the starting point of the target video indicates the starting position of the first pitch motion in an individual batter's box in the sports play video.

According to another embodiment, the sports play may be soccer, the events may include a score, and the target video may include an individual score video or a score collection video.

The aforementioned device may be implemented by a hardware component, a software component and/or a combination of a hardware component and a software component. For example, the device and components described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor or any other device capable of executing or responding to an instruction. A processor may perform an operating system (OS) and one or more software applications executed on the OS. Furthermore, the processor may access, store, manipulate, process and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, a code, an instruction or a combination of one or more of them and may configure a processor so that the processor operates as desired or may instruct the processor independently or collectively. The software and/or the data may be embodied in any type of machine, component, physical device, virtual equipment or computer storage medium or device in order to be interpreted by the processor or to provide an instruction or data to the processor. The software may be distributed to computer systems connected over a network and may be stored or executed in a distributed manner. The software and the data may be stored in one or more computer-readable recording media.

The method according to various embodiments may be implemented in the form of a program instruction executable by various computer means and stored in a computer-readable recording medium. In this case, the recording medium may continue to store a program executable by a computer or may temporarily store the program for execution or download. Furthermore, the recording medium may be various recording means or storage means of a form in which one or a plurality of pieces of hardware has been combined. The recording medium is not limited to a medium directly connected to a computer system, but may be one distributed over a network. Examples of the recording medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the recording medium may include an app store in which apps are distributed, a site in which various pieces of other software are supplied or distributed, and recording media and/or storage media managed in a server.

Various embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A or/and B", "A, B or C" or "at least one of A, B and/or C", may include all of possible combinations of listed items together. Expressions, such as "a first," "a second," "the first" and "the second", may modify corresponding elements regardless of the sequence and/or importance, and are used to only distinguish one element from the other element and do not limit corresponding elements. When it is described that one (e.g., first) element is "(operatively or communicatively) connected to" or "coupled with" the other (e.g., second) element, one element may be directly connected to the other element or may be connected to the other element through another element (e.g., third element).

The "module" used in this document includes a unit configured as hardware, software or firmware, and may be interchangeably used with a term, such as logic, a logical block, a part or a circuit. The module may be an integrated part, a minimum unit to perform one or more functions, or a part thereof. For example, the module may be configured as an application-specific integrated circuit (ASIC).

According to various embodiments, each of elements (e.g., module or program) may include a single entity or a plurality of entities. According to various embodiments, one or more of the aforementioned elements or operations may be omitted or one or more other elements or operations may be added. Alternatively or additionally, a plurality of elements (e.g., modules or programs) may be integrated into a single element. In such a case, the integrated element may perform one or more functions of each of the plurality of elements identically or similarly to a function performed by a corresponding element of the plurality of elements before they are integrated. According to various embodiments, operations performed by a module, a program or other elements may be executed sequentially, in parallel, repeatedly, or heuristically, or one or more of the operations may be executed in different order or may be omitted, or one or more operations may be added.

According to various embodiments, the electronic device can detect a target video in a sports play video based on text broadcasting data, and may provide the target video. In this case, the electronic device described in this document according to various embodiments can detect and provide the target video even without additional infrastructure for newly obtaining a video because text broadcasting data and the sports play video are used. Accordingly, the electronic device can efficiently provide the target video with low complexity in terms of operation and structure. Furthermore, accordingly, the electronic device can provide the target video at a fast speed. For example, the electronic device may provide a target video with several minutes from the end timing point of sports play.

What is claimed is:

1. An operating method of an electronic device, comprising:
    detecting a reference timing point with respect to text broadcasting data and detecting a reference location with respect to a sports play video, respectively, by mapping the text broadcasting data and the sports play video based on events occurring during sports play, wherein the reference timing point is a timing point within a timeline of the text broadcasting data, and the reference location is a time location within a timeline of the sports play video, wherein the detecting of the reference timing point and the reference location comprises:
    identifying occurrence time locations of a plurality of events in the sports play video, respectively, by analyzing the sports play video;
    identifying motion sections of predetermined motions between the occurrence time locations in the sports play video, respectively, by recognizing the predetermined motions in the sports play video;
    identifying actual timing points of the events within the timeline of the text broadcasting data;
    mapping the actual timing points to the occurrence time locations of the events within the timeline of the text broadcasting data, respectively;
    detecting an actual timing point of a first event, among the events, as the reference timing point; and detecting the reference location within the timeline of the sports play video by applying each of time intervals between the reference timing point and each of the actual timing points of remaining events among the events to each timing point of the motion sections between the occurrence time locations in the sports play video;

detecting a plurality of target occurrence time locations of target events among events within the timeline of the sports play video from the reference location within the timeline of the sports play video by applying a time interval associated with each of the target events to the reference location, wherein the time interval associated with each of the target events is an amount of time between the reference timing point and an actual timing point of each of the target events within the timeline of text broadcasting data; and providing a target video based on the target occurrence time locations of the target events within the timeline of the sports play video.

2. The operating method of claim 1, further comprising:
confirming the occurrence time locations of events in the sports play video, respectively, by recognizing a score board of the sports play video as the analysis of the sports play video.

3. The operating method of claim 2, wherein the confirming of the occurrence time locations comprises:
recognizing the score board in the sports play video;
identifying a predetermined index within the score board;
recognizing an event count based on a location of the index within the score board; and
confirming the occurrence time location of each event when the event count is changed.

4. The operating method of claim 1, wherein the providing of the target video comprises providing a combined target video by combining the target video with at least another target video.

5. The operating method of claim 1, wherein:
the sports play is baseball,
the events comprise pitching,
the target video comprise an individual batter's box video,
the motions comprise a pitching motion, and
a starting point of the target video indicates a starting position of a first pitch motion in an individual batter's box in the sports play video.

6. The operating method of claim 4, wherein:
the sports play is soccer,
the events comprise a score, and
the target video comprises an individual score video or a score collection video.

7. A non-transitory computer-readable recording medium for storing a program for executing the operating method of an electronic device as defined in claim 1.

8. An electronic device comprising:
a memory; and
a processor coupled to the memory and configured to execute at least one instruction stored in the memory,
wherein the processor is configured to:
detect a reference timing point with respect to text broadcasting data and detect a reference location with respect to a sports play video, respectively, by mapping the text broadcasting data and the sports play video based on events occurring during sports play, wherein the reference timing point is a timing point within a timeline of the text broadcasting data, and the reference location is a time location within a timeline of the sports play video, identify occurrence time locations of a plurality of events in the sports play video, respectively, by analyzing the sports play video;

identify motion sections of predetermined motions between the occurrence time locations in the sports play video, respectively, by recognizing the predetermined motions in the sports play video;

identify actual timing points of the events within the timeline of the text broadcasting data;

map the actual timing points to the occurrence time locations of the events within the timeline of the text broadcasting data, respectively;

detect an actual timing point of a first event, among the events, as the reference timing point;

detect the reference location within the timeline of the sports play video by applying each of time intervals between the reference timing point and each of the actual timing points of remaining events among the events to each timing point of the motion sections between the occurrence time locations in the sports play video; and detect a plurality of target occurrence time locations of a plurality of target events among the events within the timeline of the sports play video from the reference location in the sports play video by applying a time interval associated with each of the target events to the reference location, wherein the time interval associated with each of the target events is an amount of time between the reference timing point and an actual timing point of each of the target events within the timeline of the text broadcasting data, and provide a target video based on the target occurrence time locations of the target events within the timeline of the sports play video.

9. The electronic device of claim 1, wherein the processor is configured to:
recognize the score board in the sports play video,
identify a predetermined index within the score board,
recognize an event count based on a location of the index within the score board, and
confirm the occurrence time location of each event when the event count is changed.

10. The electronic device of claim 8, wherein the processor is configured to provide a combined target video by combining the target video with at least another target video.

11. The electronic device of claim 1, wherein:
the sports play is baseball,
the events comprise pitching,
the target video comprise an individual batter's box video,
the motions comprise a pitching motion, and
a starting point of the target video indicates a starting position of a first pitch motion in an individual batter's box in the sports play video.

12. The electronic device of claim 10, wherein:
the sports play is soccer,
the events comprise a score, and
the target video comprises an individual score video or a score collection video.

* * * * *